Figure 1:
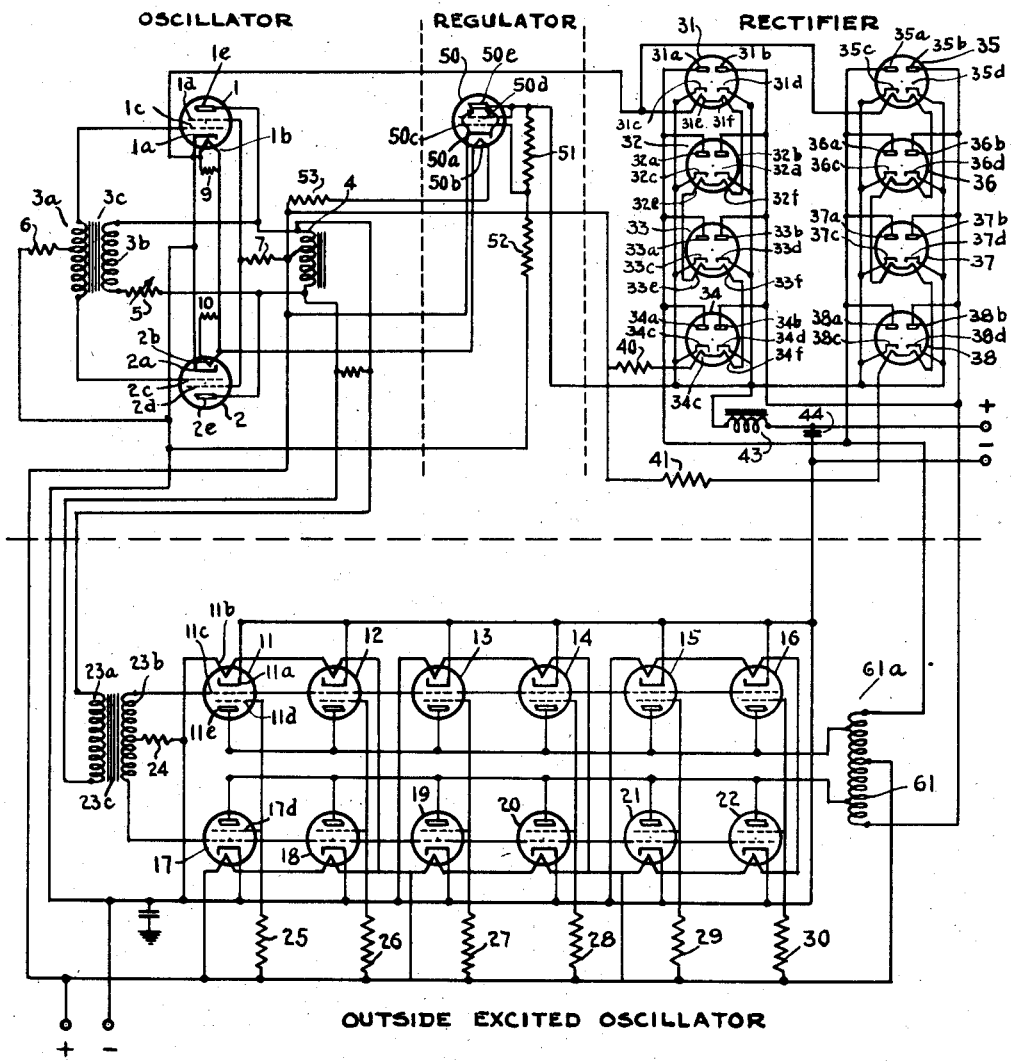

April 18, 1939.  L. W. PARKER  2,155,362

DIRECT CURRENT VOLTAGE BOOSTER

Filed Oct. 7, 1937

Louis W. Parker
INVENTOR.

BY *M. Theodore Simmons*

ATTORNEY.

Patented Apr. 18, 1939

2,155,362

UNITED STATES PATENT OFFICE 2,155,362

DIRECT CURRENT VOLTAGE BOOSTER

Louis W. Parker, Woodside, Long Island, N. Y., assignor to C. S. I. Development Corporation, New York, N. Y.

Application October 7, 1937, Serial No. 167,719

13 Claims. (Cl. 171—97)

This invention relates to apparatus for increasing the voltage available from a direct current source of supply, and more particularly to apparatus which requires no vibrators, interrupters, rotating parts, commutators or the like.

My invention is particularly useful in locations where direct current of 100 to 120 volts is available, and where it is desired to operate vacuum tube apparatus such as radio receivers, sound amplifying and broadcasting systems, and the like.

As my example, my system finds especial utility on ships where the usual electrical system is direct current having a voltage range as above stated, and where it is desired to operate intercommunicating systems for transmitting speech between various parts of the vessel, employing amplifiers, which for optimum operation requires voltages above those available from the ship's generating system.

In accordance with my invention I prefer to employ a system of vacuum tubes divided into groups comprising an excitation oscillator or driver of the relaxation type (not employing tuned circuits) an oscillator-amplifier which may be of the same oscillator type, a rectifier and filter system, which converts the A. C. thus generated into direct current, and connections for adding the direct current voltage so produced to that already available from the supply line, together with means for maintaining the output voltage relatively constant in spite of fluctuations in load.

Such a system comprises no moving parts, is extremely reliable in operation, and operates with an extraordinarily high efficiency to supply power of the order of 100 watts suitable for the purposes desired.

From the foregoing it will be understood that among the objects of my invention are the following:

To provide a direct current voltage booster system requiring no vibrating or moving mechanical parts such as interrupters, commutators or the like.

To provide such a system to transform direct current into alternating current, rectify and filter the same, and add the direct current so produced to the direct current available from the supply line.

To provide such a system employing an oscillator of the relaxation type which will deliver an output voltage which remains relatively constant of load fluctuations.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which—

Figure 2:
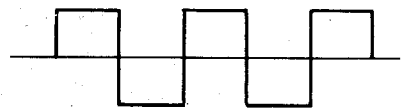

Figure 1 is a circuit diagram of the system in accordance with my invention, and Fig. 2 is a curve showing the shape of wave form generated by the oscillating system.

Referring now more particularly to Fig. 1, the oscillator or driver part of the system is indicated at the upper left corner of the circuit diagram, and preferably comprises a pair of tubes 1 and 2, connected in what is ordinarily called push-pull arrangement. Each of these tubes preferably, although not necessarily, comprises a cathode 1a and 2a, respectively, control grid 1c and 2c, screen grid 1d and 2d, and anodes 1e and 2e. Indirect heating of the cathodes is provided by means of filaments 1b and 2b.

The control grids 1c and 2c respectively may be connected to opposite ends of an input coil 3a, the mid-point of which is connected through resistance 6 to the cathode.

The respective plates 1e and 2e are connected to opposite ends of output coil 4, and from the same ends of the coil 4 connections are made to a secondary coil 3c, coupled to primary coil 3a, this forming, as will be seen, a species of feedback causing the tubes to oscillate.

It will be noted that in the feed-back connection there may be provided resistance 5 and that there may also be a connection through resistance 7 from the midpoint of the plate coil 4 to each of the screen grids 1D and 2D. Coils 3 and 4 are provided with cores of magnetic material so that the tube system oscillates at audio frequency, the frequency of the oscillation being controlled by adjustment or selection of the desired values of resistances 5 and 6.

In the operation of the system as an oscillator, the circuit does not follow Thompson's law. In other words, the frequency is not determined by the inductance and capacity of the circuit, but is controlled by varying resistance 5 or resistance 6 (preferably by resistance 5) which may be set to the desired value and left alone, and the circuit will continue to oscillate at the selected frequency. Best results are obtained when the frequency of the oscillation is somewhere in the neighborhood of 50 to 100 cycles.

The wave form produced is substantially that shown in Fig. 2, and is not a sine wave, but is on the other hand, nearly square top in form.

The filaments may be in parallel from the 110 volt supply line, resistances 9 and 10 being provided for adjustment of the current, and the paralleled filaments of tubes 1 and 2 are preferably in series with the filament of the regulator tube hereinafter to be described.

The voltage developed across coil 4 may be rectified as hereafter explained, but ordinarily it will be desired to first amplify it. This may be accomplished by applying the oscillations to excite an oscillator or oscillator-amplifier, indicated on the drawing by the title, "Outside excited oscillator".

In its preferred form, the outside excited oscillator-amplifier comprises a pair of banks of tubes, each bank consisting of a number of tubes in parallel, such as six or less, and the two banks are connected in what is termed push-pull. The upper bank may comprise tubes 11, 12, 13, 14, 15 and 16, all in parallel, each comprising a cathode ($a$), control grid ($c$), screen grid ($d$), anode ($e$) and a filament ($b$), all of the anodes being connected together, and likewise all of the control grids.

While we have referred to the outside excited "oscillator-amplifier" it might at this point be explained that this "oscillator-amplifier" partakes of the characteristics of an amplifier, and also of an oscillator and will operate very satisfactorily as an oscillator without outside excitation (being excited by its own feed-back connection and generating a square wave form) provided the load is constant or substantially so, and it is only where substantial fluctuations of load are expected, that outside excitation need be employed. In fact, it may be pointed out that the excitation oscillator shown as providing the outside excitation, is essentially the same circuit as employed in the "oscillator-amplifier", supplying a constant or substantially constant excitation load to the "oscillator-amplifier".

The screen grid $d$ of each of the upper tubes is connected to the screen grid $d$ of the tube immediately below it and each of these grids is connected through a resistance to the positive terminal of the source of supply. For example, screen grid 17$d$ and screen grid 11$d$ are connected through resistance 25, the screen grids of the next pair of tubes 12 and 18 through resistance 26, the next through resistance 27, the next through resistance 28, the next through resistance 29, and the last through resistance 30.

The excitation, it will be seen, is supplied to the control grids of the tubes 11–22 from the secondary coil 23$b$ associated with the primary coil 23$a$ connected to the output coil 4 (which may be shunted by resistance 44). These coils are provided with a core 23$c$ of magnetic material and the midpoint of the secondary coil 23$b$ is preferably connected through resistance 24 to the cathodes which in turn is connected to the negative side of the source of supply. All of the cathodes of the tubes 11 to 22 inclusive are connected together. Connection is also made to the filament 11$c$ of tube 11, and it will be noted that the filament of tubes 11, 12, 17 and 18 are connected in series across the 110 volt supply line, and similarly filaments of tubes 13, 14, 19 and 20 are connected in series across said supply line and also the filaments of tubes 15, 16, 21 and 22.

The output is drawn from the system through autotransformer 61, the primary terminals of which are connected to plates or anodes 16$e$ and 22$e$ of tubes 16 and 22 respectively, and the midpoint of which is connected back to the positive side of the supply line. From the secondary terminals of the output transformer 61 the alternating current is led to the rectifier system. The transformer 31 is provided with a core of magnetic material 61$a$, and is arranged to step up its output voltage preferably not more than 2 to 1. It is important that an auto-transformer be used instead of a two-winding transformer because of the reduced leakage reactance of the auto-transformer. Because of the square wave form of the oscillations generator, the efficiency of the system would drop off to a very considerable extent if a two winding transformer were used. I find also that the step-up ratio of the auto-transformer should not be more than 1 to 2 because of the increase in leakage reactance which increases with the increase in the step-up ratio, thereby reducing the efficiency. Best results are found to be obtained when the step-up is just enough to overcome the drop in the rectifier and filter.

The rectifier system preferably comprises a multiplicity of rectifier tubes in parallel herein indicated as eight in two banks of four each, but it will be understood that this number may be increased or decreased as desired. The tubes are preferably of the same type and identical in characteristics and structure with each other and each comprises a pair of anodes such as 31$a$, and 31$b$, in rectifier tube 31, a pair of cathodes 31$c$ and 31$d$ and a pair of filaments or heaters 31$e$ and 31$f$ connected in series.

The heaters of the tubes 31, 32, 33 and 34, preferably all connected in series, and across the source of supply in series with resistance 40 which serves to adjust the heater current. The filaments of tubes 35, 36, 37 and 38 are likewise connected in series across the source of supply with resistance 41 which adjusts the heater current in said tubes.

Similar electrodes of corresponding tubes are connected together. For instance, anodes 31$a$, 32$a$, 33$a$, and 34$a$ are all connected together, and anodes 31$b$, 32$b$, 33$b$ and 34$b$ are connected together. In tubes 35, 36, 37 and 38, similar connections are made, and the bank of anodes 31$a$, 32$a$, 33$a$, 34$a$, is connected to the bank of anodes 35$a$, 36$a$, 37$a$, and 38$a$. Similarly, the bank of anodes 31$b$, 32$b$, 33$b$ and 34$b$, is connected to the bank of anodes, 35$b$, 36$b$, 37$b$ and 38$b$. Cathodes 31$c$, 32$c$, 33$c$, 34$c$, 35$c$, 36$c$, 37$c$ and 38$c$, are connected together, and similarly cathodes 31$d$, 32$d$, 33$d$, 34$d$, 35$d$, 36$d$, 37$d$ and 38$d$, are connected together.

One output terminal of the transformer 61 is connected to the group of anodes 31$a$ to 38$a$, and the other terminal of the said transformer is connected to the group of anodes 31$b$ to 38$b$, the midpoint of said transformer being connected to the positive terminal of the source of supply. All of the cathodes of tubes 31 to 38 are connected together and through choke 43 to the positive output terminal, and condenser 44 may be connected across the positive and negative output terminals, the negative output terminal being connected back to the cathode system of the separately excited oscillator and thence to the negative side of the source of supply.

Voltage regulation on the output side may be obtained from the regulator tube 50, shown as comprising cathode 50$a$, heater 50$b$, control grid 50$c$, screen grid 50$d$, and anode 50$e$. The anode 50$e$ (and screen 50$d$) is connected to the cathode system of the rectifier, and is therefore at the positive potential value of the output minus the drop in inductance 43 which is very small. The cathode of the said tube is connected to the positive terminal of the source of supply. The filament of said tube may be connected through resistance 53 in series with the filament of tubes 1 and 2, which are in parallel. The anode may also be connected through resistances 51 and 52 to the negative side of the source of supply, and the control grid 50c connected between resistances 51 and 52. Preferably, the resistances 51 and 52 are in the ratio of 2:3, and with the tubes employed excellent results have been obtained when resistance 51 has an effective value of 10,000 ohms, and resistance 52 an effective value of 6,666 ohms. These values are so chosen that under normal condition the potential value of the control grid 50c and that of the cathode 50a is substantially the same. If, then, the output voltage increases above the desired value, the potential of the control grid will become positive with reference to that of the cathode of tube 50, and the tube will begin to draw current. That is to say, an increase in the output voltage imparts a positive bias to the control grid causing the tube 50 to draw an increased current and this increase in current reduces the output voltage. Conversely, should the output voltage decrease below the desired values, the control grid of the regulator tube becomes negatively biased with respect to the filament, decreasing the current flowing through the tube, and permitting the output voltage to rise, the action being to tend to maintain the output voltage more or less constant in spite of fluctuations in load.

The operation of the system, it is believed, will be clear from the foregoing. When the system is in operation, the oscillator system comprising tubes 1 and 2, oscillates, and impresses upon the separately excited oscillator, comprising tubes 11 to 22 inclusive, an oscillatory voltage of square wave form. This wave is considerably increased in power at the output of the output transformer, and is rectified in the rectifier system comprising tubes 31 to 38 inclusive, filtered by the inductance 43 and condenser 44, and added to the voltage already existing across the direct current source.

While I do not desire to be limited to the specific type of tube, for the purpose of providing a complete disclosure, it may be stated that very satisfactory results have been obtained when tubes 1 and 2 are of the 48 type, as well as tubes 11 to 22. The rectifier tubes may be 25Z5, the regulator tube a 6L6G. In such circumstances and employing the number of tubes indicated I have obtained as much as 100 watts from the output terminals.

Certain points may be noted at this time. I have found as much as 50 to 100% increase in power can be obtained over what would otherwise be obtainable in conventional oscillator circuits by employing an oscillator which generates a square wave form.

Also, by the employment of a square waveform oscillator, satisfactory filtering is obtained with a much simpler and less expensive filter, and the rectifier tubes are operating at maximum current capacity during the entire half cycle during which they pass current; i. e. if a sine wave-form were used, the tubes would pass maximum current only on peaks.

Attention is invited to the connections of the screen in both banks of tubes in a separately excited oscillator, both screens being maintained at the same potential value as in tubes 11 and 17, 12 and 18, etc. The purpose of this connection is to maintain both screens at the same potential value so that the screen voltage cannot rise on the screen in a tube which shuts off due to negative bias on the control grid during the excitation. If this screen voltage were permitted to rise, it would to a certain extent, tend to counteract the effect of the negative charge on the control grid and thereby decrease the efficiency of the system.

Attention is invited to resistances 6 and 24. By the use of these resistances, there is provided a voltage drop across each resistance equal to one-half that across the entire grid coil, and the polarity is such that between the cathode and grid of one tube of the push-pull system, substantially no potential difference exists, whereas, between the cathode and grid of the other tube of the push-pull system, the potential differences add and the grid is negative, with respect to the cathode by twice the amount of the drop through the resistance. This is found to be very effective in preventing loss of efficiency due to dissipation of power in the grid circuit which would otherwise occur.

I find that the use of a separately excited oscillator has the advantage that the power generated is more nearly independent of load. If, for example, the oscillator system comprising tubes 11 and 22, were not separately excited, it would be found that an increase in load would cause a decrease in excitation. This in turn would cause a decrease in the output, which in turn would cause a still further decrease in excitation, and the system would be unstable, tending to stop oscillating under load. By the use of the separate excitation stage ahead of it, this difficulty is overcome to a very considerable extent.

While I have shown and described certain preferred embodiments of my invention, it will be understood that modification and changes may be made without departing from the spirit and scope of my invention.

I claim:

1. In a direct current voltage booster system of the non-mechanical type, in combination, a vacuum tube oscillator comprising a pair of tubes in push-pull, an oscillator-amplifier excited by said oscillator and comprising a multiplicity of tubes in parallel push-pull, a rectifier system for rectifying the output of said oscillator-amplifier, a direct current source of supply for energizing said tubes and connections for adding the voltage of the rectified output of said oscillator to the voltage of said direct current source.

2. In a direct current voltage booster system of the non-mechanical type, in combination, a vacuum tube oscillator comprising a pair of tubes in push-pull forming an oscillator system of the relaxation type, an oscillator-amplifier excited by said oscillator and comprising a multiplicity of tubes in parallel push-pull, a rectifier system for rectifying the output of said oscillator-amplifier, a direct current source of supply for energizing said tubes, connections for adding the voltage of the rectified output of said oscillator to the voltage of said direct current source, and means associated with the output of said rectifier for maintaining the output voltage thereof relatively constant in spite of variations of load.

3. In a direct current booster system of the non-mechanical type, in combination, a vacuum tube oscillator comprising a pair of tubes in push-pull, forming an oscillator system of the relaxation type generating an oscillatory wave of square wave form, an oscillator-amplifier excited by said oscillator and comprising a multiplicity of tubes in parallel push-pull, a rectifier system for rectifying the output of said oscillator-amplifier, a direct current source of supply for energizing said tubes, connections for adding the voltage of the rectified output of said oscillator to the voltage of said direct current source, and means associated with the output of said rectifier for maintaining the output voltage thereof relatively constant in spite of variations of load, said last means comprising a vacuum tube, the space current path of which acts as a bleeder across the output of said rectifier system.

4. In a direct current voltage booster system, of the non-mechanical type in combination, a vacuum tube oscillator system for generating oscillations of substantially square wave form, means for amplifying said oscillations without substantial change of wave form, a rectifying and filtering system for rectifying and filtering the output of said amplifier, a direct current source of supply for energizing said oscillator, amplifier and rectifier systems, an auto transformer interposed between the output of said amplifier and the input of said rectifier system, and connections for adding the potential difference of the rectifier output to the potential difference of said direct current source of supply.

5. In a direct current voltage booster system, of the non-mechanical type, in combination, a vacuum tube oscillator system for generating oscillations of substantially square wave form, means for amplifying said oscillations without substantial change of wave form, a rectifying and filtering system for rectifying and filtering the output of said amplifier, a direct current source of supply for energizing said oscillator-amplifier and rectifier systems, an auto-transformer interposed between the output of said amplifier and the input of said rectifier system, and connections for adding the potential difference of the rectifier output to the potential difference of said direct current source of supply, the step-up ratio of said auto-transformer being no greater than 1 to 2.

6. In a direct current voltage booster system of the non-mechanical type, in combination, a vacuum tube oscillator of the relaxation type comprising a pair of tubes in push-pull, a feed-back connection from the output of said oscillator to the input thereof, a frequency controlling element positioned in said feed-back circuit and comprising resistance only, an amplifier excited by said oscillator, a rectifier system for rectifying the output of said amplifier, a direct current source of supply for energizing said oscillator, amplifier and rectifier systems, and connections for adding the voltage of the rectifier output of said oscillator to the voltage of said direct current source.

7. In a direct current voltage booster system of the non-mechanical type, in combination, a vacuum tube oscillator of the relaxation type, comprising a pair of tubes in push-pull, an input coil connected to the input circuit of the said tubes, a frequency controlling element connected between the midpoint of said input coil and the cathodes of said tubes, said frequency determining element comprising resistance only, an amplifier excited by said oscillator, a rectifier system for rectifying the output of said amplifier, a direct current source of supply for energizing said tubes, and connections for adding the voltage of the rectifier output of said oscillator to the voltage of said direct current source.

8. In a direct current voltage booster system of the non-mechanical type, in combination, a separately excited oscillator system comprising a plurality of tubes in parallel push-pull, each tube comprising cathode, control electrode, screen electrode, and anode, connections for exciting the control electrodes of said push-pull tubes in opposite phase and connections for exciting the screen electrodes of all of said tubes in the same phase.

9. In a direct current voltage booster system of the non-mechanical type, in combination, a separately excited oscillator system comprising a plurality of tubes in parallel push-pull, each tube comprising cathode, control electrode, screen electrode, and anode; connections for exciting the control electrodes of said push-pull tubes in opposite phase and means for maintaining the screen electrodes of all of said tubes at the same relative potential value at all times.

10. In a direct current voltage booster system of the non-mechanical type, in combination, a vacuum tube oscillator system comprising a pair of tubes in push-pull, a feed-back connection from the output of said tubes to the input thereof, said tubes forming an oscillator of the relaxation type generating oscillations of square wave form, a frequency-determining element in said feed-back connection, said frequency-determining element comprising resistance only, a rectifier system for rectifying the output of said oscillator, an auto-transformer interposed between said oscillator and said rectifier, a direct current source of supply for energizing said vacuum tubes, and connections for adding the potential difference of said source of supply to the potential difference of the output of said rectifier system.

11. In a direct current voltage booster system of the non-mechanical type, in combination, a vacuum tube oscillator system comprising a pair of tubes in push-pull, a feed-back connection from the output of said tubes to the input thereof, said tubes forming an oscillator of the relaxation type, a frequency-determining element in said feed-back connection, said frequency-determining element comprising resistance only, a rectifier system for rectifying the output of said oscillator, an auto-transformer interposed between said oscillator and said rectifier, a direct current source of supply for energizing said vacuum tubes, and connections for adding the potential difference of said source of supply to the potential difference of the output of said rectifier system, said step-up auto-transformer having a step-up ratio not to exceed 1 to 2.

12. In a direct current voltage booster system of the non-mechanical type, in combination, a vacuum tube oscillator system comprising a pair of tubes in push-pull, a feed-back connection from the output of said tubes to the input thereof, said tubes forming an oscillator of the relaxation type generating a substantially square wave, a frequency-determining element in said feed-back connection, said frequency-determining element comprising resistance only, a rectifier system for rectifying the output of said oscillator, an auto-transformer interposed between said oscillator and said rectifier for passing the output of said oscillator to said rectifier without substantially changing the wave form thereof, said auto-transformer having a step-up ratio not to exceed 1 to 2, a direct current source of supply for energizing said vacuum tubes, and connections for adding the potential difference of said source of supply to the potential difference of the output of said rectifier system.

13. In a direct current voltage booster system of the non-mechanical type, in combination, a vacuum tube oscillator system comprising at least a pair of tubes in push-pull, a feed-back connection from the output of said tubes to the input thereof, an inductance in the input circuit of said tubes, a connection from the midpoint of said inductance to the cathodes of said tubes, said connection including a resistance, and said tubes forming a relaxation oscillator generating a substantially square wave form, a rectifier system for rectifying the output of said oscillator, and means for transferring the output of said oscillator to said rectifier while substantially maintaining the square wave form.

LOUIS W. PARKER.